United States Patent

Koyama et al.

[11] Patent Number: 5,998,782
[45] Date of Patent: Dec. 7, 1999

[54] WATER DROP DETECTOR ON TRANSPARENT SUBSTRATE

[75] Inventors: Tadashi Koyama; Keiji Tsunetomo; Shuhei Tanaka; Hideki Imanishi, all of Osaka, Japan

[73] Assignee: Nippon Sheet Glass Co., Ltd., Osaka, Japan

[21] Appl. No.: 09/191,188

[22] Filed: Nov. 13, 1998

[30] Foreign Application Priority Data

Nov. 14, 1997 [JP] Japan .................................. 9-313678

[51] Int. Cl.[6] .................................................. G02B 6/42
[52] U.S. Cl. ........................... 250/227.25; 250/227.24; 250/222.2; 318/643
[58] Field of Search ..................... 250/227.24, 227.25, 250/227.11, 222.2, 574; 318/643, 483; 340/602, 604; 356/445

[56] References Cited

U.S. PATENT DOCUMENTS

| | | | |
|---|---|---|---|
| 5,391,891 | 2/1995 | Wiegleb et al. | 250/574 |
| 5,414,257 | 5/1995 | Stanton | 250/227.25 |
| 5,498,866 | 3/1996 | Bendicks et al. | 250/227.25 |
| 5,661,303 | 8/1997 | Teder | 250/341.8 |
| 5,703,568 | 12/1997 | Hegyi | 340/602 |
| 5,811,793 | 9/1998 | Pientka | 250/227.25 |

FOREIGN PATENT DOCUMENTS 2-67945  3/1990  Japan .

Primary Examiner—Frank G. Font
Assistant Examiner—Layla G. Lauchman
Attorney, Agent, or Firm—Pillsbury Madison & Sutro LLP

[57] ABSTRACT

A windshield (transparent substrate) 1 having the function of detecting the presence of water drops W upon one side surface of the windshield depending upon variations in an amount of reflected light, comprising a rain sensor provided on the other side surface of the windshield, which further comprises: light emitting means 6 for guiding light into the windshield 1; light receiving means 7 for detecting the light which is reflected within the windshield 1; and, light shielding members 10 and 11 provided on the other side surface of the windshield 1 opposing the light emitting means 6 and the light receiving means 7, respectively; wherein the light shielding member 10 shields the light emitted from the light emitting means 6 at an incident angle less than a critical angle at which total internal reflection occurs at a boundary surface between air and the windshield 1, while the other shielding member 11 shields outside ambient light incident upon the light receiving means 7.

2 Claims, 2 Drawing Sheets

WATER DROP DETECTOR ON TRANSPARENT SUBSTRATE

BACKGROUND OF THE INVENTION

1. Field of the Invention

The present invention relates to a water drop detector on a transparent substrate for detecting the presence of water drops present on a front surface of the transparent substrate by using a light emitting element and a light receiving element.

2. Description of Prior Art

Conventionally, as is described in Japanese Patent Laying-Open No. 2-67945 (1990), for example, there is already known a water drop detector apparatus for detecting water drops present on a windshield or other front window glass of a vehicle, which comprises a light emitting means including a light emitting element and so on and a light receiving means including a light receiving element and so on, wherein light is irradiated towards the windshield from the light emitting means, thereby determining that the water drops adhere only on the front surface of the windshield when an output signal from the light receiving means that receives the reflected light lies within a predetermined region of a level indicative of no adhesion of water drops, while determining that the water drops do adhere even on an interior surface of the windshield when the signal exceeds the predetermined region of the level indicative of no adhesion of water drops.

However, the water drop detector apparatus of the conventional art has drawbacks in that it may malfunction if any light coming from the outside enters directly into the light receiving means, and also in that the light from the light emitting means may go directly to the outside thereof, and further in that it has poor aesthetic appeal since a portion of the light receiving means can be seen from the outside thereof.

SUMMARY OF THE INVENTION

According to the present invention, for resolving the above-mentioned problems, there is provided a water drop detector on a transparent substrate having the function of detecting the presence of liquid water upon one side surface of the transparent substrate depending upon variations in an amount of reflected light, comprising a sensor device provided at the other surface side of said transparent substrate, the sensor further comprising:

light emitting means for guiding light into said transparent substrate;

light receiving means for detecting the light which is reflected within said transparent substrate; and light shielding members provided at the other surface side of said transparent substrate opposing said light emitting means and said light receiving means, respectively; wherein one of the light shielding members shields the light emitted from said light emitting means at an incident angle less than a critical angle at which total internal reflection occurs upon a boundary surface between ambient air and said transparent substrate, while another one of the light shielding members shields ambient light incident upon said light receiving means.

In this way, the light shielding members are provided at the other side of said transparent substrate opposite to said light emitting means and said light receiving means, thereby prohibiting light emitted from the light emitting means from passing through the transparent substrate and escaping directly outside, and preventing any external ambient light from entering into the light receiving means from the outside.

Further, with the provision of the light shielding members, those portions or parts of the light emitting means and the light receiving means which constitute the sensor device cannot be seen from the outside, thereby obtaining a pleasing aesthetic effect.

Also, according to the present invention, there is provided a water drop detector on a transparent substrate as defined above, wherein the light emitted from said light emitting means is emitted at an incident angle less than the critical angle so that the total internal reflection occurs at least two times within the glass substrate comprising the sensor device, and the light which undergoes the total internal reflection within said transparent substrate enters into said light receiving means after having undergone total internal reflection at least two times within said glass substrate.

In this manner, the light for detecting the presence of any liquid on the one side of the transparent substrate causes the total internal reflection to occur at least two times within the glass substrate comprising the detector, and it is therefore possible to ensure sufficient space for provision of the light shielding members opposing and covering the light emitting means and the light receiving means upon the other side surface of the transparent substrate.

BRIEF DESCRIPTION OF DRAWING(S)

DETAILED DESCRIPTION OF PREFERRED EMBODIMENT(S)

Hereinafter, embodiments according to the present invention will be fully explained by referring to the attached drawings.

Figure 1:
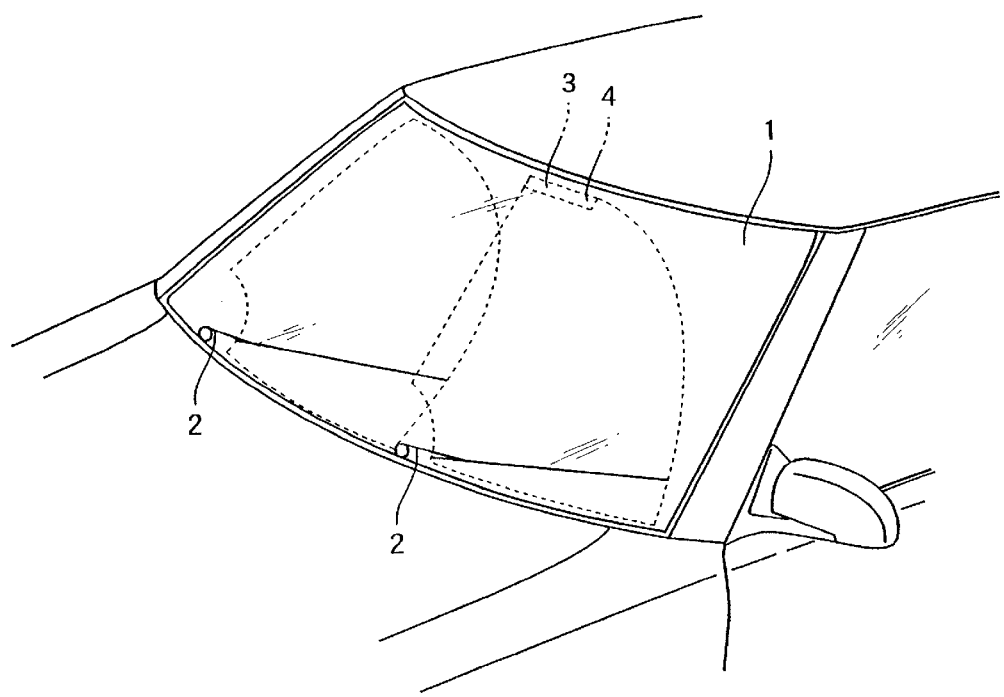
FIG. 1 shows a perspective view of a front portion of a car to which is applied the water drop detector on a transparent substrate according to the present invention.

As shown in FIG. 1, on an interior side surface of a front glass or windshield 1 (transparent substrate) of an automobile, a rain sensor 3 is attached by an adhesive (an adhesive tape) 4 within a wiping area of a pair of wipers 2 for wiping an outside surface thereof. As the adhesive (the adhesive tape) 4, one is selected that has a refractive index that is almost the same as that of the windshield 1 (approximately 1.48). Further, as the windshield 1, a soda lime glass plate containing mainly $SiO_2$ and having a thickness of 5 mm is used. It should be noted that although the windshield (transparent substrate) of an automobile is recited above, the invention is applicable to other front wind-shielding glass plates, including, for example, a window in a building, a front glass plate on a ship, or any other glass plate that is exposed to the elements.

Figure 2:
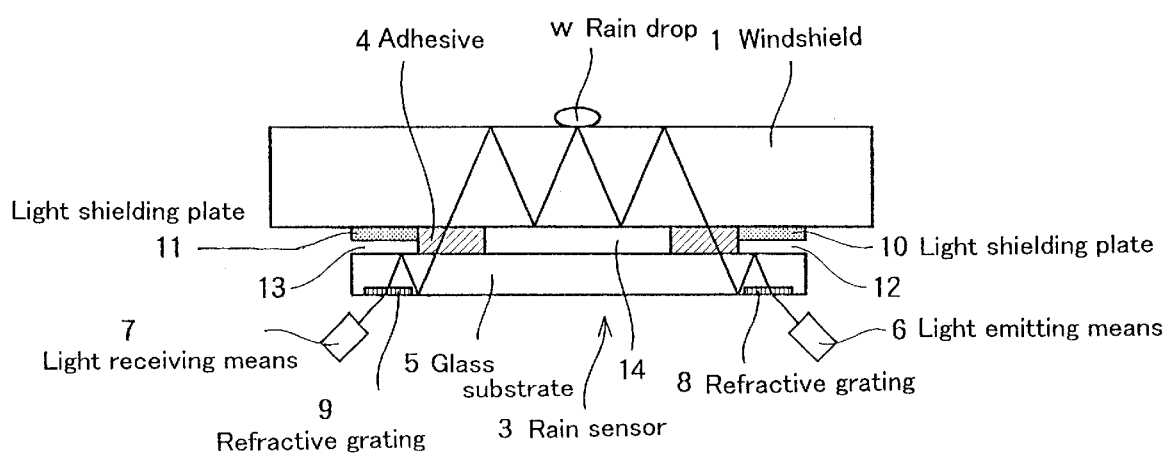
FIG. 2 shows details of the construction of the water drop detector on a transparent substrate according to the present invention.

The rain sensor 3 comprises, as shown in FIG. 2, a glass substrate 5, light emitting means 6, light receiving means 7, etc. On the surface of the glass substrate 5 upon which the light emitting means 6 and the light receiving means 7 are facing, diffraction gratings 8 and 9 are formed. The diffraction gratings 8 and 9 are preferably to be formed directly upon the substrate surface through an ablation process which is performed by irradiating a laser beam onto the surface of the glass substrate 5.

On the interior side surface of the windshield 1 towards which the light emitting means 6 and the light receiving means 7 are facing, there are fixed light shielding plates 10 and 11 and further, between the light shielding plates 10 and 11, and the glass substrate 5, there are formed air gaps 12 and 13. The reason for providing the air gaps 12 and 13, i.e., layers of air having a refractive index of 1.0, between the light shielding plates 10 and 11 and the glass substrate 5 is for the purpose of allowing a laser beam to undergo total internal reflection at an incident angle less than a predetermined angle inside of the glass substrate 5.

However, if the refractive index of the light shielding plates 10 and 11 is equal to that of air, i.e., 1.0, the laser beam will undergo the total internal reflection upon a boundary surface between the light shielding plate 10 or 11 and the glass substrate 5, and therefore, there would be no necessity to provide the air gaps 12 and 13.

The adhesive 4 is pasted on the glass substrate 5 escaping slightly offset from the light shielding plates 10 and 11 which are fixed on the windshield 1, and fixes the rain sensor 3 upon the windshield 1.

Further, by pasting the adhesive 4 not all over the surface of the glass substrate 5 but intermittently thereover, space portions 14 are formed between the glass substrate 5 and the windshield 1, in each of which dry air is enclosed. However, the glass substrate 5 and the windshield 1 also can be closely contacted with each other through the adhesive, without providing any such space portions 14 between the glass substrate 5 and the windshield 1.

The light emitting means 6 includes a light emitting element, such as a light emitting diode (LED) or a laser diode (LD), that is positioned in the vicinity of one of the refractive gratings, grating 8, while the light receiving means 7 includes a light receiving element, such as a photo diode (PD), that is positioned in the vicinity of the other refractive grating, grating 9. Light emitting means 6 and light receiving means 7 can also be positioned closely to each other.

Here, the refractive grating is an optical element that is constructed with fine grooves or incised lines formed on the surface of the glass substrate 5. Almost all diffraction gratings are designed to have grooved lines that are aligned within a pitch range from about 0.4–3 μm, and they are separately applied depending on the intended use thereof. Diffraction gratings are mainly for use in spectrum analysis. However, in a case where monochromatic light is used as the light source, a diffraction grating can be used for bending or diffracting the light.

Further, as the refractive grating, there can be used a reflection type or a slit-shape type other than the refractive grating mentioned above, and further, a refractive grating can be used in which the refractive indexes are changed periodically.

Figure 3:
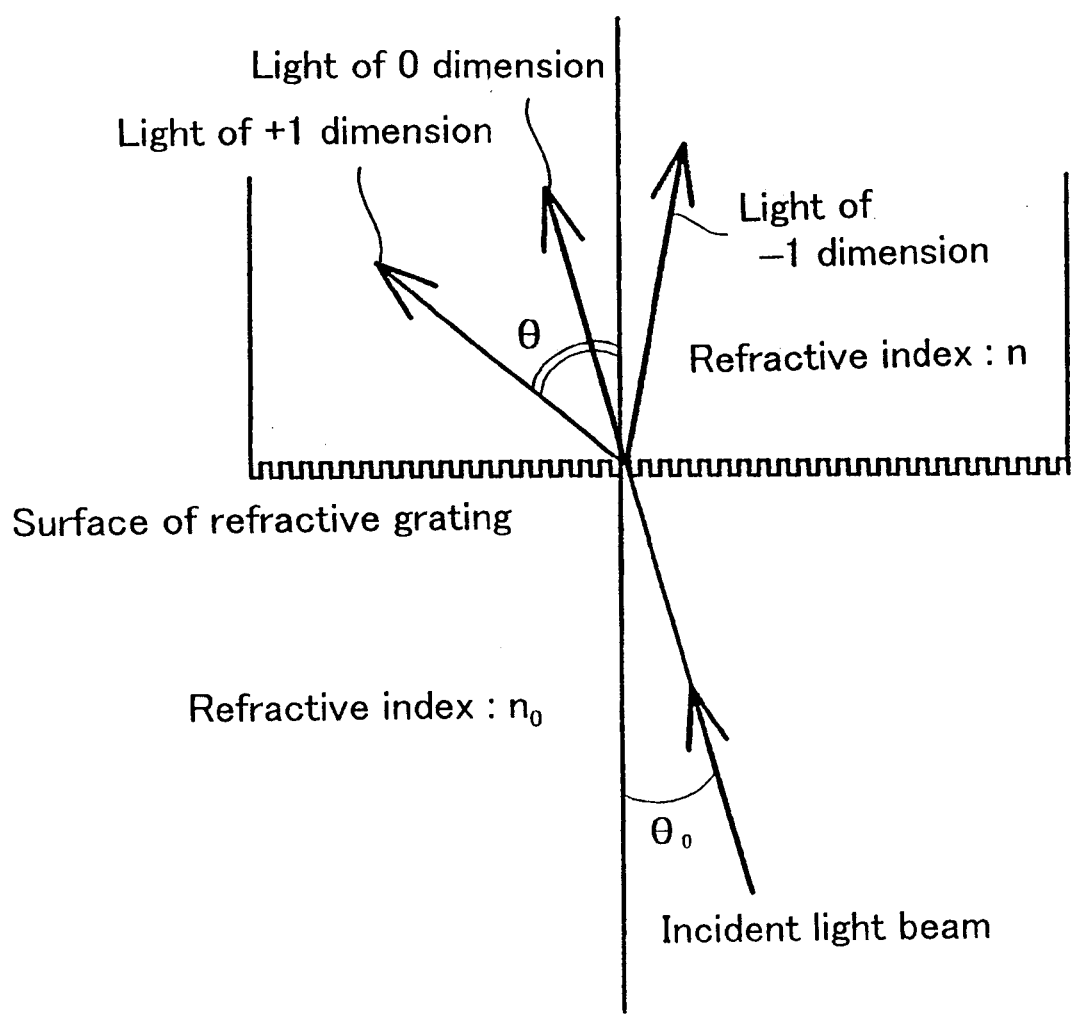
FIG. 3 is an explanatory view of the function of a diffracting grating.

The effect or function which is used in the present invention is the phenomenon whereby refracted light is produced on the basis of a certain constant rule. The refracted light is, as shown in FIG. 3, generated from primary refraction lobe at a constant angle with respect to the incident light. In addition, although refracted light from higher diffraction lobes is generated, the primary refracted lobe light is mainly used because the light of other lobes is small in amplitude.

When the incident light enters the gratings, the relationship between the angles of the incident light and the refracted light is expressed by the following equation Eq. (1). Namely, assuming that the angle of the incident light is $\theta_0$, the angle of the refracted light of the M-th dimension lobe is $\theta$, the wavelength of the incident light $\lambda$, the pitch of the grooves d, the refractive index of the medium at the exit side n, and the refractive index of the medium at the incident side $n_0$, the angular relationship can be determined as expressed in the following:

$$n \cdot \sin\theta - n_0 \cdot \sin\theta_0 = m\lambda/d (m=0, \pm1, \pm2, \ldots) \quad \text{(Eq. 1)}$$

In the case where the incident medium is air and the exit medium a transparent plate, then $n_0=1.0$, and the angle of the light propagating within the transparent plate can be adjusted by changing the angle at which the light is incident upon the refractive grating.

As mentioned above, by using the refractive grating, it is possible to introduce the light into the transparent plate at an arbitrary angle. Further, by selecting the incident angle upon the refractive grating appropriately, it is also possible to set it so that total internal reflection will occur to the light introduced into the transparent plate.

Further, on the same principle, it is also possible to allow the light which experiences the total internal reflection within the transparent plate to exit from the transparent plate into the air.

Moreover, for obtaining an incident angle at which the total internal reflection occurs at the boundary surface between the air and the glass, i.e., a critical angle, the calculation below can be conducted by using Snell's law. A general equation of Snell's law is as expressed by equation (2) below:

$$n_0 \cdot \sin\alpha_0 = n \cdot \sin\alpha \quad \text{(Eq. 2)}$$

where, $\alpha$ and $\alpha_0$ are angles of the boundary surface of the material having refractive index n and the material of the refractive index no with respect to normal lines thereof ( $\alpha$: incident angle, and $\alpha_0$: refracted angle).

In the case where the refractive index is n=1.48 as mentioned above and that of air is $n_0=1$, the condition under which total internal reflection is caused inside of the glass plate is $\alpha=42.5°$, as found from equation Eq. 2, since $\alpha_0=90°$ C. Accordingly, if the incident angle $\alpha$ is greater than that angle (i.e., greater than 42.5°, total internal reflection will occur inside of the medium of the glass.

On the other hand, even in the case where water is present upon the surface of the medium, the condition where total internal reflection occurs is calculated by the same equation, with the result that $\alpha=64.0°$ C., assuming that the refractive index of the water is 1.33.

Accordingly, in the case where the incident angle $\alpha$ is in a range from 42.5° to 64.0°, total internal reflection will occur within the glass when no water is present thereupon, while total internal reflection will not occur even if the water is present, and the light transmitting inside of the glass will escape to the outside through the water.

The incident angle upon the refractive grating is adjusted so as to cause the reflection phenomena mentioned above. The incident angle upon the refractive grating for obtaining a reflection angle of 42.5° within the glass is calculated by using Eq. 1 mentioned above. When a groove pitch of 1020 nm is provided in the refractive grating on the glass surface and a positive primary (1st dimension lobe) of refracted light having a wavelength of 633 nm emitted from a He—Ne laser is utilized, the incident angle comes to be 22°.

So as to obtain a reflection angle of 64.0°. inside of the glass, as is apparent from the same equation, the incident angle upon the refractive grating should be 45°. In the present embodiment, the light is incident upon the refractive grating 8 at an angle 45° C. The light which is reflected through total internal reflection at this time exits or is emitted from the other refractive grating 9.

Furthermore, in the case where plural rain drops W are present at the total internal reflection points, the amount of light which can be emitted from the other refractive grating 9 is reduced, and in particular when the rain drops W are present over all possible total internal reflection points, it is reduced to one-fiftieth (1/50) of the output light.

Namely, it can be confirmed that the presence of water upon the surface of the glass can be detected with high sensitivity, corresponding to the strength of the exiting light. On the other hand, by increasing the incident angle upon the refractive grating 8 gradually, the same phenomenon occurs.

However, if the incident angle is made greater than 64°, even when water drops W are adhered over all the possible total internal reflection points, the amount of light exiting therefrom does not change. This angle almost corresponds to that at which the condition for total internal reflection in the inside of the glass does not change even when water is present upon the surface.

An explanation will now be given on the function of the water drop detector on a transparent substrate which is constructed in the manner mentioned above. As shown in FIG. 2, the laser beam which is emitted from the light emitting means 6 is incident upon the refractive grating 8.

Then, the positive primary lobe refracted light, as shown in FIG. 3, is emitted from the refractive grating 8 at a refraction angle θ, and then as shown in FIG. 2, it propagates straight or rectilinearly (rectilinear propagation) in the inside of the glass substrate 5 and undergoes total internal reflection upon the boundary surface between the glass substrate 5 and the air gap 12. The light further propagates rectilinearly in the inside of the glass substrate 5 and undergoes total internal reflection upon the boundary surface between the glass substrate 5 and the air at the interior side of the substrate 5.

The laser beam, which is reflected more than two (2) times upon the boundary surfaces between the glass substrate 5 and air, further propagates rectilinearly within the glass substrate 5, the adhesive 4, and the windshield 1, and undergoes total internal reflection upon the boundary surface between the windshield 1 and the air outside of the windshield. Moreover, the laser beam which is reflected on the boundary surface between the windshield 1 and the outside air propagates rectilinearly within the windshield and undergoes total internal reflection upon the boundary surface between the windshield 1 and the air of the space portion 14.

However, in the case where the glass substrate 5 and the windshield 1 are adhered closely without providing the space portions 14 thereinbetween, the light again undergoes total internal reflection upon the boundary surfaces between the windshield 1 and the outside air and between the glass substrate 5 and the air, respectively.

The total internal reflection is repeated upon the boundary surfaces between the windshield 1 and the air in this manner. However, if water drops are present on the windshield 1 at the outside of the detector (i.e., water is present at the reflection points of the laser light), since a portion of the laser light penetrates through the windshield 1 depending upon the amount of water drops W, the light amount is decreased at each of the reflection points.

After repeating the total internal reflections, the laser beam propagates rectilinearly within the windshield 1, the adhesive 4, and the glass substrate 5, and undergoes total internal reflection upon the boundary surface between the glass substrate 5 and the interior air. The laser beam subject to the total internal reflection further propagates rectilinearly within the glass substrate 5 and undergoes the total internal reflection upon the boundary surface between the glass substrate 5 and the air gap 13.

Further, the laser beam, which undergoes total internal reflection more than two (2) times upon the boundary surface between the glass substrate 5 and the air gap 13 now enters into the light receiving means 17 after propagating rectilinearly within the glass substrate 5 and being incident upon the refractive grating 9.

Using processing means (not shown), the rain sensor 3 compares the laser beam signal level emitted from the light emitting means 6 with that of the laser beam entering into the light receiving means 7 to detect the amount of water W adhered upon the windshield 1.

Since the light shielding plate is provided on the surface of the windshield opposing the light receiving means 6, any light having an incident angle that is less than the critical angle (at which total internal reflection occurs upon the boundary surface between the air and the windshield 1) is shielded by the light shielding plate 10 from the laser beam emitted from the light receiving means 6. Therefore, it does not penetrate through the windshield 1 to the outside directly, thereby exerting no influence upon other instruments or devices therearound.

Further, since the light shielding plate 11 is provided on the surface of the windshield 1 opposing the light receiving means 7, the external ambient light, which can sometimes equal 150,000 Lux (under bright sunlight in mid-summer for instance), will not enter into the light receiving means 7 directly, thereby avoiding a wiper controller or other control means—actuated and controlled by the water drop detector according to the present invention—from malfunctioning due to excess light.

Being so constructed that the light for detecting any water drops W present upon the outer side of the windshield 1 undergoes total internal reflection at least two (2) times, it is possible to ensure sufficient space to provide the light shielding plates 10 and 11 for covering and hiding the light emitting means 6 and the light receiving means 7 opposing thereto on the surface of the windshield at the interior side thereof.

Further, with provision of the light shielding plates 10 and 11, the light emitting means 6 and the light receiving means 7 which comprise the rain sensor 3 cannot be seen from the outside, thereby aesthetic qualities of the apparatus.

What is claimed is:

1. A water drop detector on a transparent substrate having the function of detecting the presence of liquid water upon one side surface of the transparent substrate depending upon variations in an amount of reflected light, comprising:

a sensor device provided at the other surface side of said transparent substrate, the sensor further comprising:
light emitting means for guiding light into said transparent substrate;
light receiving means for detecting the light which is reflected within said transparent substrate; and light shielding members provided at the other surface side of said transparent substrate opposing said light emitting means and said light receiving means, respectively; wherein one of the light shielding members shields the light emitted from said light emitting means at an incident angle less than a critical angle at which total internal reflection occurs upon a boundary surface between ambient air and said transparent substrate, while the other of said light shielding members shields ambient light incident upon said light receiving means.

2. A water drop detector on a transparent substrate as defined in claim 1, wherein the light emitted from said light emitting means is emitted at an incident angle less than the critical angle so that total internal reflection occurs at least two times within a glass substrate comprising said sensor device, and the light which undergoes the total internal reflection within said transparent substrate enters into said light receiving means after having undergone total internal reflection at least two times within said glass substrate.

* * * * *